United States Patent [19]

Albright et al.

[11] 4,090,411
[45] May 23, 1978

[54] SKID-STEERED TRACTOR VEHICLE COMBINED STEERING LEVER AND AUXILIARY CONTROL WITH SELF-CENTERING MECHANISM

[75] Inventors: Larry E. Albright, Gwinner; James J. Bauer, Lisbon; Earl W. Cramton, Gwinner, all of N. Dak.

[73] Assignee: Clark Equipment Company, Buchanan, Mich.

[21] Appl. No.: 724,814

[22] Filed: Sep. 20, 1976

Related U.S. Application Data

[62] Division of Ser. No. 635,559, Nov. 26, 1975, Pat. No. 4,043,416.

[51] Int. Cl.[2] .............................................. G05G 9/00
[52] U.S. Cl. ................................ 74/471 XY; 180/6.48
[58] Field of Search ................... 74/471 XY, 479; 137/636.2; 200/6 A; 180/6.48

[56] References Cited

U.S. PATENT DOCUMENTS

| 3,605,519 | 9/1971 | Heggen | 180/6.48 X |
| 3,741,031 | 6/1973 | Schwerdtfeger | 74/471 XY |
| 3,811,336 | 5/1974 | Pulskamp | 74/471 XY |
| 4,027,547 | 6/1977 | Rahman et al. | 74/471 XY |

*Primary Examiner*—Allan D. Herrmann
*Attorney, Agent, or Firm*—Harry G. Thibault

[57] ABSTRACT

A skid-steered tractor vehicle is driven by right and left hydrostatic transmissions having separate steering levers, one for each transmission. A centering device acting directly on the transmission controls is longitudinally shiftable against the force of a spring in response to pivotal movement of either steering lever from a neutral or idle position for returning the steering lever upon release.

Also, there is a second pivotal mounting for one or both steering levers in a plane at right angles to the pivot axis of the levers for controlling auxiliary functions without interfering with the steering movements of the levers.

2 Claims, 7 Drawing Figures

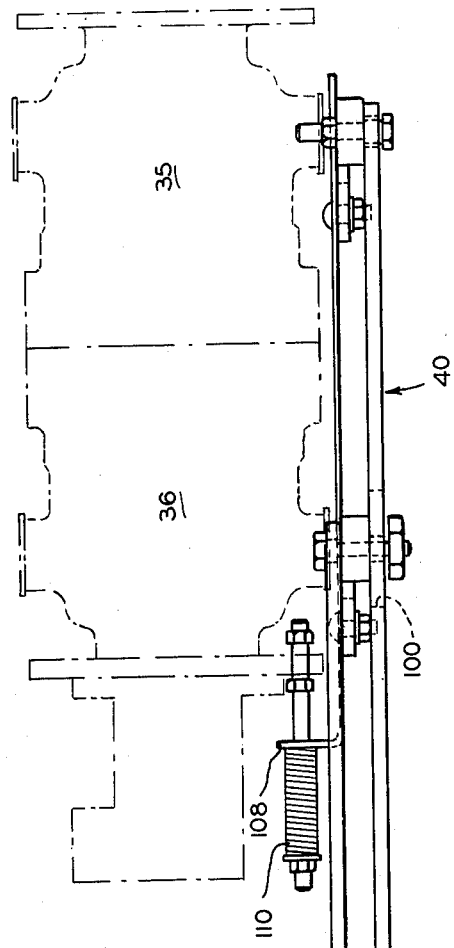
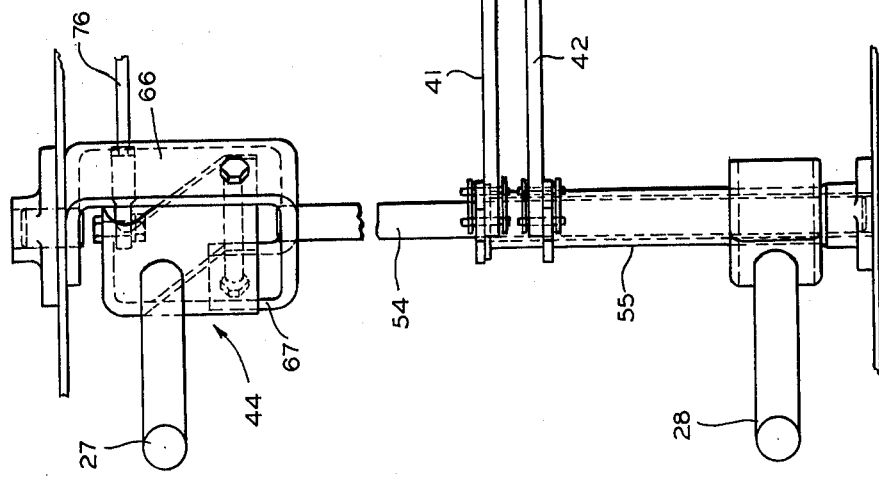
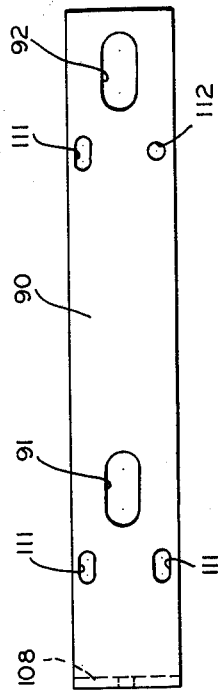

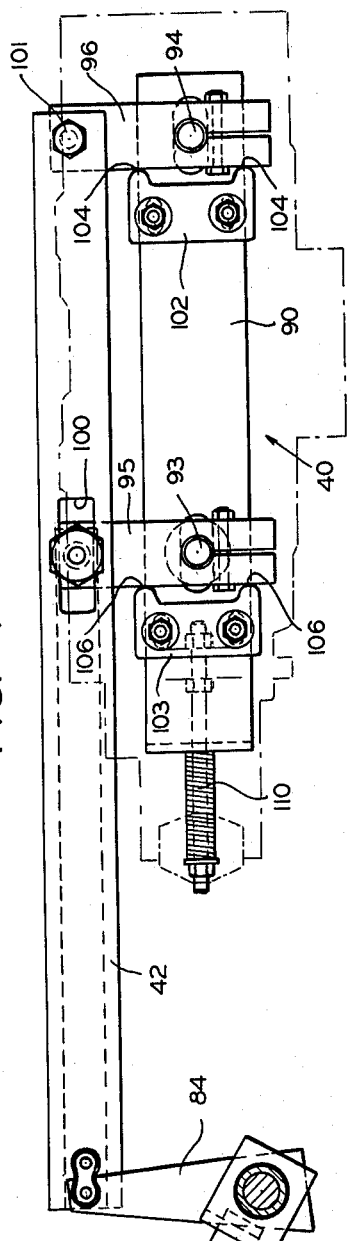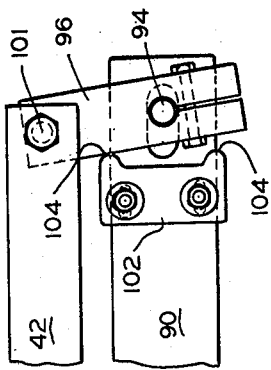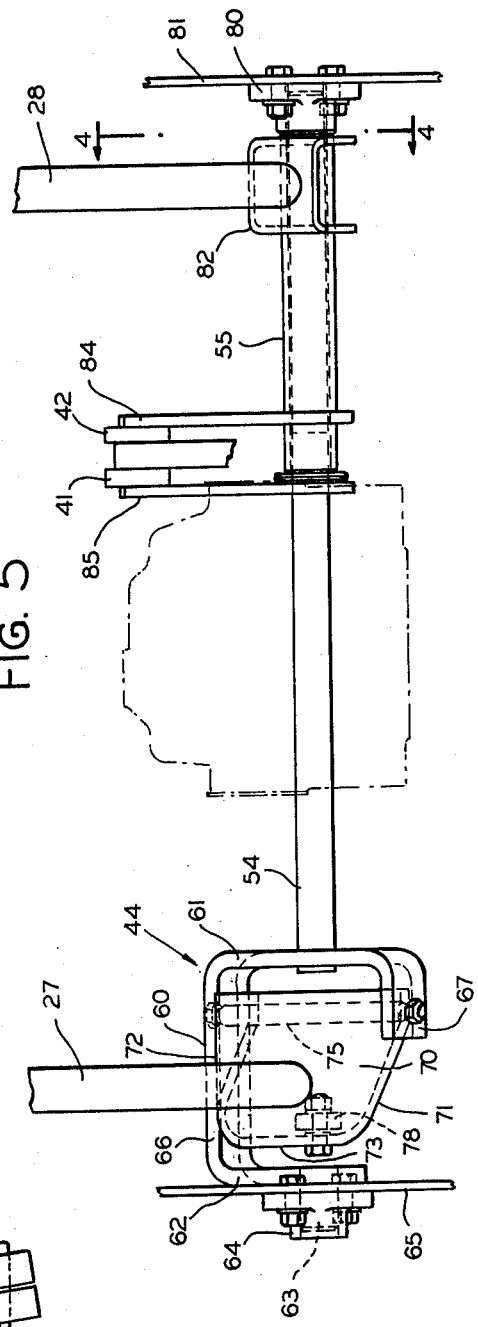

SKID-STEERED TRACTOR VEHICLE COMBINED STEERING LEVER AND AUXILIARY CONTROL WITH SELF-CENTERING MECHANISM

This is a division, of application Ser. No. 635,559, filed Nov. 26, 1975 now U.S. Pat. No. 4,043,416.

BACKGROUND OF THE INVENTION

1. Field of the Invention

The invention pertains to the art of vehicle controls and more particularly to controls for skid-steered tractor vehicles having separate hydrostatic transmissions. A four-wheel skid-steered vehicle of the type to which the present invention pertains is disclosed in U.S. Pat. No. 3,635,365 entitled "Tractor Vehicle With Hydrostatic Drive Means", issued Jan. 18, 1972 to the inventor, James J. Bauer, and assigned to the assignee of the present invention.

2. Description of the Prior Art

Skid-steered loader vehicles of the type disclosed in the aforementioned patent will have right and left hydrostatic transmissions independently controlled by a pair of steering levers, one for each transmission, movable forward or back to vary the speed and power output of the transmissions in either forward or reverse directions.

A centering mechanism is used to return the levers to the neutral position once released by the operator. Such a centering mechanism is disclosed in U.S. Pat. No. 3,605,519 entitled "Control for Dual Hydrostatic Drive", issued Sept. 20, 1971, to the inventor, John P. Heggen, and assigned to the assignee of the present invention.

The centering mechanism of U.S. Pat. No. 3,605,519 is mounted at one end of the control shaft, on which the steering levers pivot and generally takes the form of a roller which travels in a V-shaped cam leaf biased by a spring such that when the levers are released, the roller is urged to the lowest point in the cam leaf which coincides with the neutral position of the levers.

The loader or material handling portions of the vehicle will be oprated by a pair of hydraulic cylinders to raise and lower the boom arms and to tilt or roll back the attachment carrier mounting an attachment such as a bucket. A control valve having separate valve sections operates the hydraulic cylinders. The separate sections are individually actuated by a linkage controlled by foot pedals in the operator's compartment.

SUMMARY OF THE INVENTION

Dual steering levers for separate hydrostatic transmissions are independently centered or returned to the zero displacement position corresponding to that position for the swash plates of the variable displacement piston pumps. The pumps are driven on a common axis and opposed with a common porting block in between such that the swash plates are controllable on one side of the pump axis. The centering mechanism includes an elongated element shiftable longitudinally along a line parallel to the pump axis carrying a pair of cam blocks making engagement with each swash plate control arm. The displacement of either swash plate control arm in either direction from zero displacement by movement of the steering levers displaces the elongated centering element against the force of a return spring. Release of the steering lever allows the spring to act through the camming blocks returning the swash plates and steering levers to the zero displacement position.

It is also a feature of the invention that one or both steering levers will be capable of pivoting inwardly or at right angles. This movement will be used to control an auxiliary function, or in the case of a skid-steer vehicle as disclosed in U.S. Pat. No. 3,635,365, to operate the boom arms and attachment carrier instead of using foot pedals in an appropriate case.

In the preferred embodiment disclosed herein, only the right-hand steering lever has the auxiliary control capability which may be used to operate a backhoe or other equipment. The steering levers are at opposite ends of independently rotatable shafts, the right-hand shaft having at the outer end thereof a carrier structure pivotally supporting the right-hand lever. The carrier structure includes a base on which the lever is mounted pivoting on an axis at right angles to the shaft axis. A downward projection of the base opposite the pivot axis connects to a link for operating a control valve. The link is connected to the projection on the shaft axis. When the lever is in a vertical position there is no longitudinal movement of the link when rotating the steering lever in a fore and aft direction for steering. However, when pivoted inwardly, the lever will pivot the base pulling the link to actuate the control valve.

One of the advantages of the present invention is that a more positive centering action is obtained where the centering mechanism is mounted on the pumps rather than being mounted at one end of the steering levers.

Also, the control mechanism itself is more accurately adjustable to accommodate the desired swash plate angle.

Also, with the centering mechanism removed from the steering levers the auxiliary control functions of the vehicle may be incorporated with the levers.

These and other advantages will be more apparent by referring to the following description of a preferred embodiment which proceeds with a description of the drawings:

DETAILED DESCRIPTION OF THE DRAWINGS

FIG. 3 is a top view of the steering levers and links connecting with the swash plate control arms on the pumps and showing the centering mechanism with the apparatus in the neutral position;

FIG. 4 is a side view of the apparatus shown in FIG. 3;

FIG. 5 is a front view of the apparatus shown in FIG. 3,

FIG. 6 is a fragmentary view showing one shifted position of the centering mechanism, and FIG. 7 is a detail of the elongated shifting element of the centering mechanism showing the openings for mounting the centering element on the shafts of the swash plate control levers and adjustment slots for the cam blocks mounted on the centering element.

DESCRIPTION OF THE PREFERRED EMBODIMENT

Figure 1:
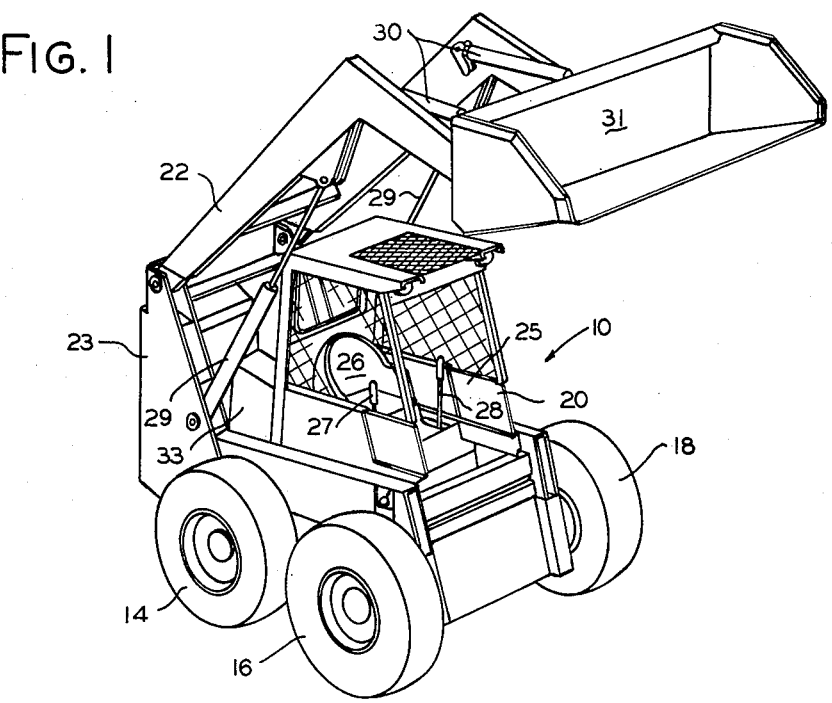
FIG. 1 is a front perspective view of a skid-steered tractor vehicle using right and left levers for steering.
Figure 2:
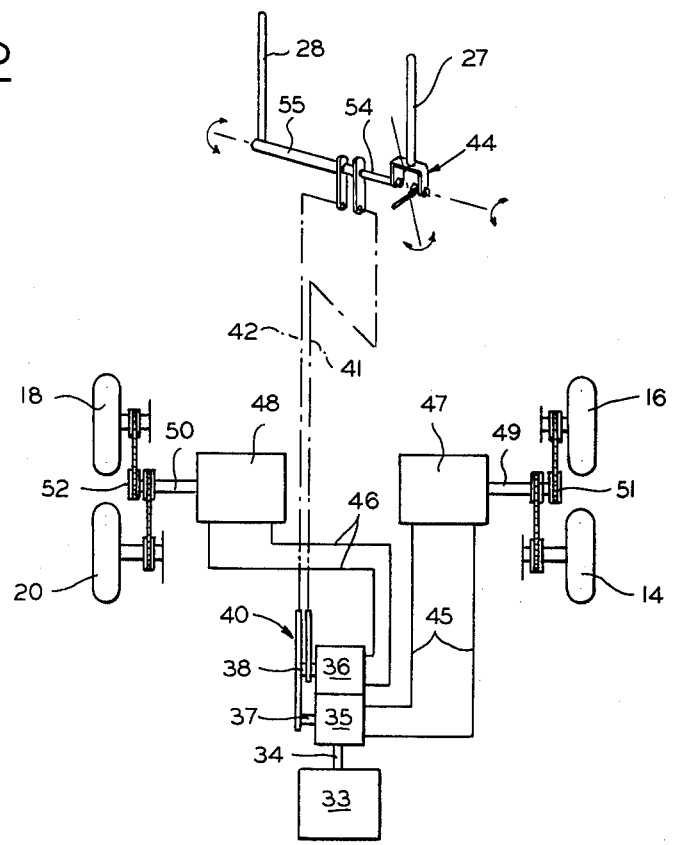
FIG. 2 is a diagrammatic view of the dual, independent hydrostatic drive controlled by the right and left steering levers and showing schematically the centering mechanism.

Referring to FIGS. 1 and 2, the reference numeral 10 denotes generally a compact, four-wheeled drive skid-steered tractor vehicle having a pair of drive wheels 14 and 16 on one side and a pair of drive wheels 18 and 20 on the other side. The vehicle 10 is equipped with a pair of boom arms 22 pivotally mounted to a pair of uprights 23 at the rear and extending forwardly alongside the operator's compartment 25 which includes a seat 26 and a pair of steering levers 27, 28. The boom arms 22 are raised and lowered by lift cylinders 29. The boom arms have mounted at their front ends an attachment carrier (not shown) pivoted by tilt cylinders 30. The attachment carrier is shown mounted with a bucket 31 although other attachments may be mounted thereon.

Some attachments will require connection with the hydraulic system of the machine and in that case the operator will control its operation with the right steering lever as an auxiliary control function. The lift and tilt cylinders 29, 30 however are controlled by foot pedals (not shown) in the operator's compartment 25. As described herein the auxiliary control function will be controlled with the right steering lever 28; however, it will be appreciated that foot pedals may be eliminated entirely and the lift and tilt cylinders 29, 30 controlled by the steering levers where both are equipped as described hereinafter for auxiliary control.

Referring to FIG. 2 the power train of the machine 10 includes an engine 33 at the rear having a drive shaft 34 powering two variable displacement hydrostatic pumps 35, 36 each having a rotating piston group (not shown) driven by the shaft 34 on a common axis. The displacement of the pistons is varied in either forward or reverse rotation by inclinable swash plates (also not shown) rotatable on control arm shafts 37, 38 of the respective pumps. Reference is made to the aforementioned U.S. Pat. No. 3,635,365 for a fuller description of such pumps which description shall be incorporated herein by reference. The steering levers 27, 28 operate the control arms through linkages 41, 42. The centering mechanism 40 is independent of the linkages 41, 42 and responds directly to movement of the swash plate control levers as described below.

The auxiliary control of the right steering lever includes the carrier mechanism 44 also described below.

The output, either forward or reverse, of the pumps 35, 36 is hydraulically coupled through fluid filled lines 45, 46 in a closed loop with hydraulic motors 47, 48. The output shafts 49, 50 of the motors drive chain and sprocket reduction units 51, 52 which in turn propel the pairs of wheels 14, 16, and 18, 20 independently in either forward or reverse directions and at varying speeds depending on the displacement of the swash plates.

As depicted in more detail in FIGS. 3, 4 and 5, and referring to FIG. 3, the right steering lever 27 is rotatable with a shaft 54 while the left steering lever 28 rotates a sleeve 55 coaxial with the shaft 54 such that either lever 27, 28 may be rotated independently for steering. The right steering lever 27 is also capable of pivoting inwardly or at right angles owing to its mounting on the carrier 44 on the end of shaft 54. The carrier 44 comprises a loop 60, one side 61 of which is fastened to the shaft 54, and the other side 62 of which is rotatably mounted by a pin 63 in a bushing 64 fastened to a side plate 65 of the machine. The loop 60 also has a side 66 joining the two sides 61, 62 and a partial side 67. The axis of shaft 54 is in line with the axis of pin 63. The lever 27 is mounted on a base 70 which is generally configured to be received within the four sides of the loop 60. The base includes opposed projections 71, 72 joined by a third 73. The base 70 is pivotally mounted in the loop 60 on a pin 75 perpendicular to the axis of the shafts 54 and offset inwardly of the steering lever 27 such that the latter may be pivoted inwardly in a plane perpendicular to the primary fore and aft plane of movement of the steering lever 27 established by the axis of the shaft 54. A link 76 pivots on the projection 73 of the base 70 at 78 coaxial with the axis of shaft 54 and pin 63 such that there is no displacement of the link 76 in rotating the lever in the fore and aft direction. Owing to the angle at which the carrier is positioned in the neutral or any forward attitude, however, a longitudinal component of motion is produced in the link 76 when the lever is pivoted at right angles. If desirable, the link 76 may be locked such that the steering lever 27 only has the steering capability.

At the opposite end of the shaft 54 is a bushing 80 mounted on the side wall 81 and aligned with the bushing 64. The steering lever 28 is secured to the sleeve 55 rotatable on the shaft 54. The sleeve 55 and shaft 54 each have a lever 84, 85 rotating conjointly therewith. The levers 84, 85 connect to the linkage 41, 42.

As shown in FIG. 4 the centering mechanism 40 includes a centering element 90, shown in detail in FIG. 6, having elongated openings 91, 92 received over the swash plate control arm shafts 37, 38 which carry the swash plate control arms 95, 96. The linkage 42 has a lost motion connection 100 bypassing the swash plate control arm 95 of the pump 36 and being pivotally connected at 101 to the swash plate control arm 96 of the pump 35 while the link 41 (FIG. 3) which connects the steering lever 27 is pivoted to the swash plate control arm 95 such that there is independent actuation of the pumps by the steering levers 27, 28.

The centering element 90 carries a pair of cam blocks 102, 103 associated with each swash plate control arm 95, 96. Each cam block has a camming projection 104, 106 engageable on opposite sides of the swash plate shaft 37, 38. The centering element 90 has a lateral projection 108 at one end which is acted upon by the coil spring 110 to urge the camming projections 104, 106 toward the shafts 37, 38.

The cam blocks 102, 103 are mounted in adjustment slots (FIG. 6) in the centering element 90 except for the circular hole 112 for the one block 103 which permit each of the cam blocks 102, 103 to be angled or adjusted relative to the desired neutral or node position of the swash plates.

In operation, when either lever 27 28 is actuated in either the fore or aft direction, one of the camming projections 104, 106 is forced by the pivoting of the swash plate control lever, as depicted in FIG. 6, to cause a shift of the centering element 90 so as to compress the springs 110. When the lever 27, 28 causing the displacement is released the spring 110 returns the centering element to the predetermined neutral or centered position which, owing to the camming projections, engaging on opposite sides of the shaft 37, 38 returns the swash plate control arms and steering levers to the neutral position.

While one preferred embodiment of our invention has been disclosed it will be understood that the description is for the purposes of illustration only and that various modifications and changes may be made without departing from the nature of the invention which is defined in the appended claims.

We claim:

1. A dual control mechanism cooperable with first and second rotatable shafts operatively connected to respective first and second independent drive means, right and left steering levers connected to the respective first and second rotatable shafts, said dual control mechanism interposed at an outer end of a first rotatable shaft between said outer end and a lower end of one of the steering levers, the dual control mechanism enabling the steering lever to cooperatively engage one of said independent drive means while operating in a first plane and movable in a second plane perpendicular to the first plan for independently controlling a second device, said dual control mechanism comprising a rotatable carrier movable in a first direction, mounted at the outer end of the shaft for rotation therewith, the carrier comprising a member having opposite side walls, a first side wall including means providing a fixed connection between the carrier and the end of the shaft, a second side wall having a pivotal connection mutually aligned with the axis of the shaft and secureable to an outer wall of a vehicle for rotation of the carrier with the shaft, said steering lever mounted for independent rotation with respect to the carrier on a base member pivotally mounted in the carrier on a pin perpendicular to the axis of the shaft and offset from the steering lever so that the steering lever may be pivoted in a plane perpendicular to the plane of movement associated with the movement of the shaft.

2. A dual control mechanism according to claim 1 wherein said base member has a pivotal connection thereon for controlling the second device aligned with the shaft axis in any position of the lever in said first plane of movement.

* * * * *